United States Patent [19]

Yoshioka

[11] Patent Number: 4,717,186
[45] Date of Patent: Jan. 5, 1988

[54] IMPLEMENT FOR DISPOSING OF DUNG OF A PET ANIMAL

[76] Inventor: Mashayuki Yoshioka, 3-31, 2-chome Higashiyurigaoka, Aso-ku, Kawasaki, Kanagawa, Japan

[21] Appl. No.: 36,884

[22] Filed: Apr. 10, 1987

[30] Foreign Application Priority Data

Nov. 5, 1986 [JP] Japan .................... 61-170436[U]

[51] Int. Cl.$^4$ .................................... A01K 29/00
[52] U.S. Cl. .................................... 294/1.5
[58] Field of Search ................ 294/1.3–1.5, 294/19.1, 55, 115; 15/104.8, 257.1, 257.6, 257.7; 119/1; 135/66; 248/95, 99, 101

[56] References Cited

U.S. PATENT DOCUMENTS

| | | | |
|---|---|---|---|
| 3,819,220 | 6/1974 | Bredt | 294/1.5 |
| 4,003,595 | 1/1977 | Fano et al. | 294/1.5 |
| 4,056,278 | 11/1977 | Bau et al. | 294/1.4 |
| 4,335,678 | 6/1982 | Garza et al. | 294/1.5 |
| 4,466,647 | 8/1984 | Spevak | 294/1.5 |

*Primary Examiner*—Johnny D. Cherry

[57] ABSTRACT

An implement for disposing of dung of a pet animal adapted to be pointed to a rump of a pet animal by a user to receive dung from the pet animal through a vinyl sack thereof, comprises an elongated tubular body having first and second ends, a housing body mounted on the elongated tubular body and for carrying vertically stacked cartridges therein, a movable plate movably supported with respect to the housing body and for moving the cartridges within the housing body one by one in a longitudinal bore of the tubular body, and a pushing rod movably inserted in the longitudinal bore and for pushing a cartridge having been located in the longitudinal bore of the tubular body by the movable plate toward the first end along the longitudinal bore of the tubular body. The cartridge comprises a pair of casing members, and a vinyl sack having a resilient wire provided along a margin of an opening thereof and being supported in a manner to be folded up between the casing members through the resilient wire, so that the vinyl sack is spreaded due to an elastic force of the resilient wire when the cartridge is moved to the first end of the tubular body and then actively projected out of the first end of the tubular body by the pushing rod.

15 Claims, 8 Drawing Figures

FIG. 8

IMPLEMENT FOR DISPOSING OF DUNG OF A PET ANIMAL

BACKGROUND OF THE INVENTION

Field of the Invention

This invention relates to an implement for disposing of dung of a pet animal such as a dog or the like, and more particularly to a dung disposing implement which is adapted to be pointed to a rump of a pet animal by a user, when the pet animal acts as if it had a call of nature, to receive dung excreted from it.

When a person walks a pet animal such as a dog or the like, he is required, in view of public morals, to dispose of dung excreted from the pet animal. Accordingly, when a sensible person walks a pet animal, he generally carries about a small-sized scoop and vinyl sacks or sheets of newspapers, and he, when the pet animal dungs during the walk, dips up dung on the ground with the scoop to get it into the vinyl sack or a sheet of the newspaper for disposal. However, it takes a great deal of trouble to carry out the work of disposing of dung in this manner. In addition, it is unshapely and troublesome to carry about a small-sized scoop and vinyl sacks or sheets of newspapers severally whenever a person walks a pet animal.

SUMMARY OF THE INVENTION

It is therefore an object of the present invention to provide an implement for disposing of dung of a pet animal which is capable of easily and efficiently carrying out disposing of dung of a pet animal.

It is another object of this invention to provide an implement for disposing of dung of a pet animal which is shapely and handy to carry.

It is still another object of this invention to provide an implement for disposing of dung of a pet animal as stated above, which is simple and can be formed easily.

Generally speaking, in accordance with the present invention, an implement for disposing of dung of a pet animal is provided which comprises tubular means consisting of an elongated tubular body which has first and second ends and a pair of pins removably fitted through upper and lower walls of the first end to project in a longitudinal bore of the tubular body; storage means being mounted on the tubular body of the tubular means and for carrying vertically stacked cartridges therein; a movable plate being movably supported with respect to the storage means and for moving the cartridges within the storage means one by one in the longitudinal bore of the tubular body; a pushing rod being movably inserted at one end thereof from the second end of the tubular body in the longitudinal bore and for pushing a cartridge having been located in the longitudinal bore of the tubular body by the movable plate towards the first end along the longitudinal bore of the tubular body; and each of the cartridges includes a pair of casing members each having a substantially U-shape in vertical section and being pivotally connected at one end thereof to each other in a manner to be faced at an opened side thereof to each other, a vinyl sack having an opening for receiving dung of a pet animal therein and having a resilient wire provided along a margin of the opening of the vinyl sack, the vinyl sack being supported through the resilient wire between the faced sides of the casing members in a manner to be folded up, and two tape pieces applied across onto upper and lower surfaces of the casing members to cause the casing members to be closed toward each other against an elastic force of the resilient wire in a manner to permit a space to be left between the casing members, the space being enough to receive tip ends of the pins of the tubular body therein when the cartridge is moved to the first end of the tubular body by means of the pushing rod.

In accordance with the present invention, there is also provided an implement for disposing of dung of a pet animal comprising:

tubular means consisting of an elongated tubular body, the tubular body comprising a first end, a second end being blocked up, a pair of pins removably fitted through upper and lower walls of the first end to project in a longitudinal bore of the tubular body, a recess formed in a lower wall portion near the closed second end of the tubular body, a through-hole formed to allow the recess to communicate with the longitudinal bore therethrough, a leaf spring seated at one end thereof against an upper surface of the recess, and a linear guide slit formed at an upper wall of the tubular body along an axial direction of the tubular body;

storage means consisting of a substantially box-like housing body which is removably mounted on the tubular body and for carrying vertically stacked cartridges therein, the housing body comprising a vertically linear slit formed at each side wall of the housing body and a plurality of recesses formed along the vertically linear slits at equal intervals;

a movable plate for moving the cartridges within the housing body one by one in the longitudinal bore of the tubular body and comprising a plate body and substantially U-shaped portions made of flexible material and extending outwardly from both sides of the plate body, the U-shaped portions each being bulged at a free end thereof, which movable plate is movably supported with respect to the storage means in a manner such that the plate body thereof is arranged in the housing body, the U-shaped portions thereof are projected outwardly through the linear slits of the houding body and the bulged free ends thereof are fitted in the linear slits, respectively, so that the movable plate can be moved in the housing body while being guided along the linear slits through the U-shaped portions and when the U-shaped portions each arrive at one of the recesses of the linear slits, the bulged free ends of the U-shaped portions are adapted to be engaged with the recesses of the housing body due to a restoring force thereof;

a pushing rod being movably inserted at one end thereof in the longitudinal bore of the tubular body and projected outwardly at the other end thereof through the closed second end of the tubular body and for pushing a cartridge having been located in the longitudinal bore of the tubular body by the movable plate towards the first end along the longitudinal bore of the tubular body; the pushing rod comprising a block provided at the one end of the pushing rod and a grip integrally formed at the other end of the pushing rod; the block being smaller than a diameter of the longitudinal bore and comprising a projection provided on an upper surface of the block, the projection extending outwardly through the linear guide slit of the tubular body to be guided through the linear guide slit in relation to longitudinal movement of the pushing rod, and a horizontal plate integrally connected perpendicularly to a tip end of the projection, the horizontal plate being formed more than a width of the linear guide slit of the tubular body;

spring means mounted on an outer periphery of the rod and arranged between the block and the closed second end of the tubular body in the longitudinal bore of the tubular body to always urge the pushing rod toward the first end of the tubular body;

an engaging ball and concavity combination locking the pushing rod with respect to the tubular body to prevent longitudinal movement of the rod in the longitudinal bore of the tubular body against an action of the spring means; the engaging ball and concavity combination comprising a ball rollably supported on an upper surface of the other end of the leaf spring and being slightly projected through the through-hole in the longitudinal bore of the tubular body due to an action of the leaf spring, and a concavity formed on a lower surface of the block, so that the rod is prevented from moving in the longitudinal bore of the tubular body against the action of the spring means when the ball is engaged with the concavity of the block; and each of the cartridges comprises a pair of casing members each having a substantially U-shape in vertical section and having a linear socket portion integrally formed along a longitudinal direction of an inner surface of an opened side of the casing member, the casing members being pivotally connected at one end thereof to each other through a pair of substantially disk-like joining plates by pins in a manner to be faced at the opened side thereof to each other; a vinyl sack having an opening for receiving dung of a pet animal therein and having a resilient wire provided along a margin of the opening of the vinyl sack, the vinyl sack being supported between the faced sides of the casing members in a manner such that the resilient wire of the vinyl sack is fitted in the socket portion of each of the casing members, and in a manner to be folded up between the casing members; and two tape pieces applied across onto upper and lower surfaces of the casing members to cause the casing members to be closed toward each other against an elastic force of the resilient wire in a manner to permit a space to be left between the casing members, the space being enough to receive tip ends of the pins of said tubular body therein when the cartridge is moved to the first end of the tubular body by means of the pushing rod.

BRIEF DESCRIPTION OF THE DRAWINGS

Other objects and many of the attendant advantages of the present invention will be readily appreciated as the same becomes better understood by reference to the following detailed description when considered in connection with the accompanying drawings, in which like reference numerals designate the same parts throughout the Figures and wherein.

DETAILED DESCRIPTION OF THE PREFERRED EMBODIMENT

Figure 1:
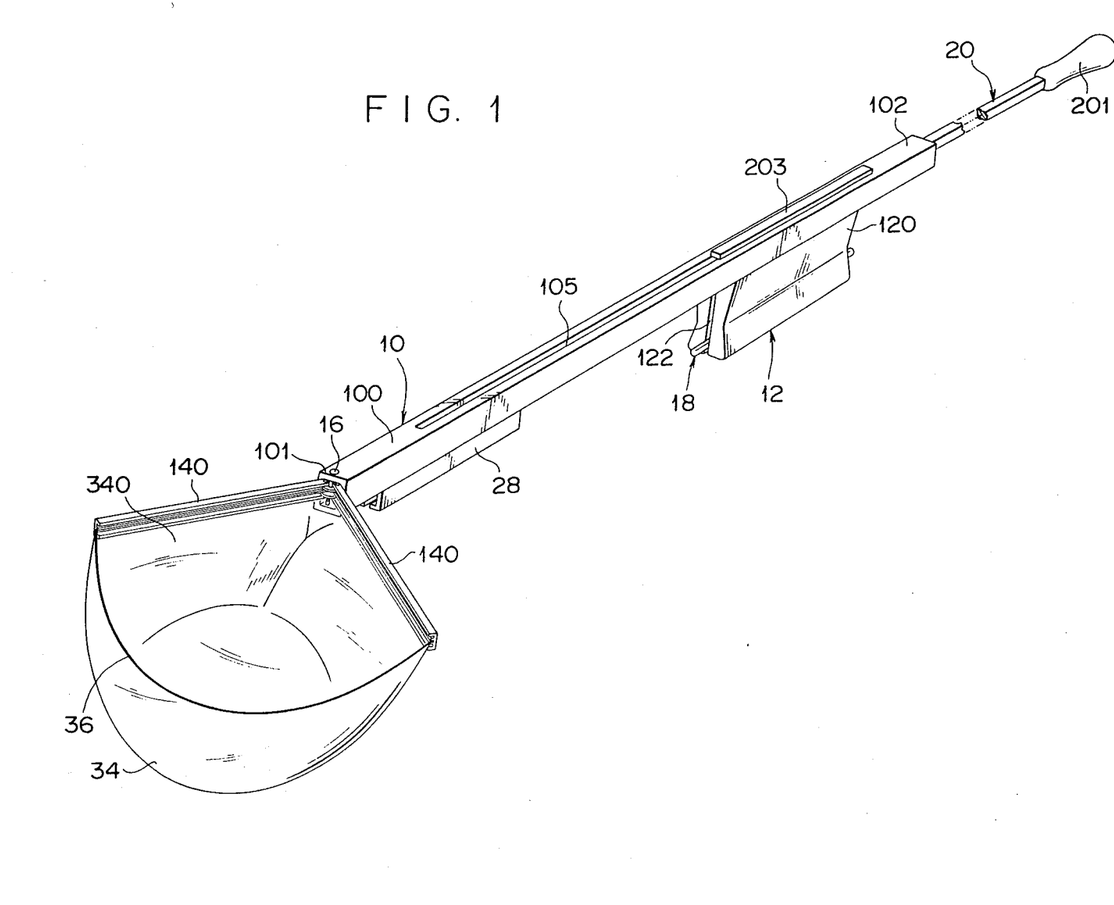
FIG. 1 is a schematic perspective view of an implement for disposing of dung of a pet animal according to the present invention, in which a vinyl sack for receiving dung excreted from a pet animal is spread.
Figure 2:
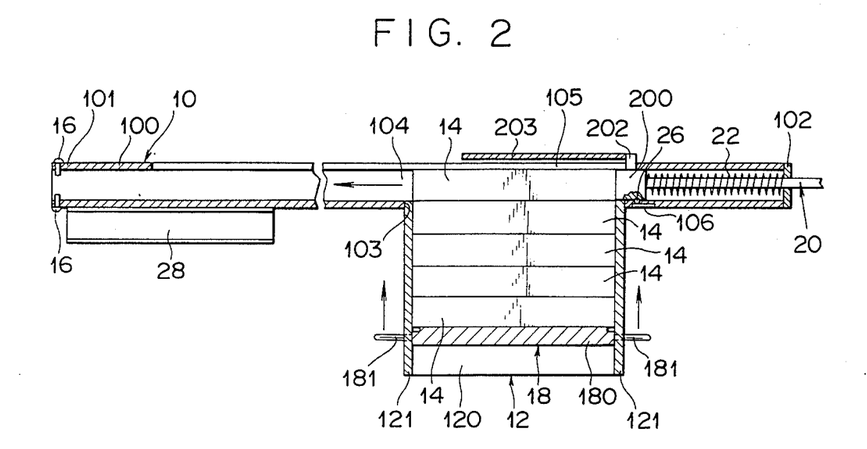
FIG. 2 is a sectional view of the dung disposing implement.

Referring to FIGS. 1 and 2, an embodiment of an implement for disposing of dung of a pet animal according to the present invention generally includes tubular means 10, storage means 12 for carrying vertically stacked cartridges 14 therein, each of which cartridges 14 has a vinyl sack for receiving dung of a pet animal contained therein as described hereinafter, a movable plate 18 and a pushing rod 20.

In the embodiment being illustrated, the tubular means 10 consists of an elongated tubular body 100 which is made of light weight material such as plastic or the like and has a first end 101 and a second end 102. As shown in FIG. 2, the tubular body 100 further has an opening 103 formed at its lower wall near the second end 102 thereof and through-holes (not shown) formed at upper and lower walls of the first end 101. In the through-holes, a pair of pins 16 are removably fitted in a manner to project in a longitudinal bore 104 of the tubular body 100. The pins 16 each are preferably pointed at its tip end.

The storage means 12 consists of a generally box-like housing body 120 which is made of lightweight material such as plastic or the like and has an opening at an upper wall thereof. The housing body 120 is adapted to carry vertically stacked cartriges 14 therein, as briefly stated above. By fitting an outer peripheral portion of the opened upper portion of the housing body 120 in the opening 103 of the tubular body 100, the storage means 12 is removably mounted with respect to the tubular means 10 so as to be perpendicular to the tubular means 10.

Figure 3:
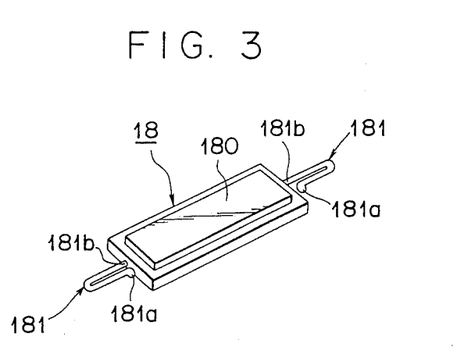
FIG. 3 is a sechematic perspective view of a movable plate incorporated in the implement.
Figure 4:
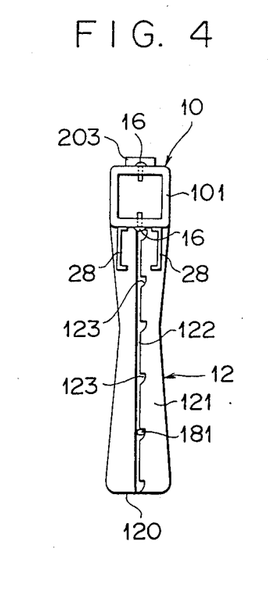
FIG. 4 is a side view of the implement.

As described above, the implement of the illustrated embodiment also includes the movable plate 18 movably supported with respect to the housing body 120, which movable plate 18 serves to move upwardly the cartridges 14 within the housing body 120 one by one in the longitudinal bore 104 of the tubular body 100. Referring to FIG. 3, the movable plate 18 comprises a plate body 180 formed by integrally laying a small plate on a top of a large plate, and U-shaped portions 181 integrally formed at both sides of the plate body 180 in a manner to extend outwardly from the both sides. Each U-shaped portion 181 is made of flexible material to be deformable and bulged at a free end 181a thereof. The movable plate 18 formed as described above is supported at the U-shaped portions 181 thereof to both side walls 121 of the housing body 120 to be movable upwardly in the housing body 120. More particularly, the movable plate 18 is movably supported to the housing body 120 in a manner such that the plate body 180 is arranged in the housing body 120, the U-shaped portions 181 of the movable plate 18 are projected outwardly through vertically linear slits 122 which are formed at the both side walls 121 (only one side wall shown in FIG. 4) of the housing body 120, and the bulged free end 181a of each U-shaped portion 181 is fitted in the slit 122. The movable plate 18 may be moved upwardly in the housing body 120 by sliding upwardly the U-shaped portions 181 along the slits 122 while deforming the bulged free ends 181a toward the other ends 181b of the U-shaped portions 181 by a user's fingers to cause the cartridges 14 within the housing body 120 to be moved upwardly. Thus, an uppermost one of the cartridges 14 vertically stacked in the housing body 120 is moved in the longitudinal bore 104 of the tubular body 100. In the illustrated embodiment, along the respective slits 122 are formed a plurality of recesses 123 at equal intervals. When the U-shaped portions 181 of the movable plate 18 are slid upwardly along the slits 122 of the housing body 120 while being deformed at the bulged free ends 181a toward the other ends 181b by a user's fingers to reach positions at which the recesses 123 are formed and are then released from the user's fingers, the bulged free ends 181a are restituted to an original state due to a restoring force thereof to be engaged with the recesses 123, respectively. By such engagement of the bulged free ends 181a of the movable plate 18 with the recesses 123 of the housing body 120, the movable plate 18 is stationarily positioned with respect to the housing body 120.

As described above, the implement of the illustrated embodiment further includes the pushing rod 20 which is movably inserted at one end thereof from the second end 102 of the tubular body 100 in the longitudinal bore 104 of the tubular body 100 and serves to push a cartridge having been positioned in the longitudinal bore 104 of the tubular body 100 by the movable plate 18 toward the first end 101 of the tubular body 100 along the longitudinal bore 104. The rod 20 may be integrally provided at the one end thereof with a pushing block 200 which is formed slightly smaller than a diameter of the longitudinal bore 104 so as to be smoothly moved in the longitudinal bore 104 of the tubular body 100. The other end portion of the rod 20 is projected outwardly through the second end 102 blocked up and is integrally formed at a tip end thereof with a grip 201. The portion of the pushing rod 20 which is inserted in the bore 104 of the tubular body 100 has a coiled spring 22 mounted on an outer periphery thereof and arranged between the pushing block 200 and the closed second end 102 of the tubular body 100, by which coiled spring 22 the pushing rod 20 is always urged towards the first end 101 of the tubular body 100. The block 200 is integrally formed on an upper surface thereof with a pin-like projection 202. The projection 202 extends upwardly through a linear slit 105 which is formed at an upper wall of the tubular body 100 in a manner to extend along the axial direction of the tubular body 100. A size or diameter of the projection 202 is smaller than a width of the slit 105, so that the projection 202 is smoothly movable in the slit 105 in relation to longitudinal movement of the rod 20 in the bore 104 of the tubular body 100. Thus, the pushing rod 20 may be moved axially in the bore 104 of the tubular body 100 while being guided along the slit 105 through the projection 202. Connected perpendicularly to an upper portion of the projection 202 is a horizontal plate 203 which serves to prevent the projection 202 from coming off from the slit 105 during the longitudinal movement of the rod 20 in the bore 104. For this purpose, the horizontal plate 203 is formed more than a width of the slit 104. This allows the pushing rod 20 to be moved while being kept horizontal in the bore 104 of the tubular body 100.

In the illustrated embodiment, the pushing rod 20 may be locked at a predetermined position within the bore 104 of the tubular body 100 against the action of the coiled spring 22. A mechanism for locking the rod 20 at a predetermined position within the bore 104 of the tubular body 100 will be described hereinafter.

Figure 5:
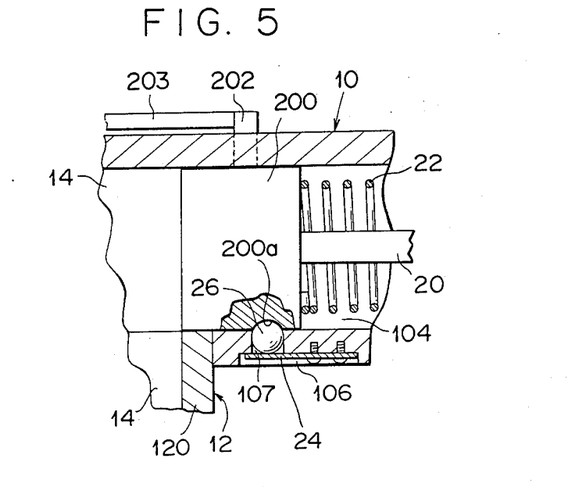
FIG. 5 is an enlarged segmentary view of the implement, in which a pushing rod is locked at a predetermined position within a longitudinal bore of tubular body.

As shown in FIGS. 2 and 5, the tubular body 100 also has a recess 106 formed in its lower wall portion between the opening 103 and the second end 102 of the tubular body, which recess 106 communicates through a through-hole 107 with the bore 104. Received in the recess 106 is a leaf spring 24, one end of which leaf spring 24 is seated against an upper surface of the recess 106, while the other end is left free and has a ball 26 rollably supported on an upper surface thereof. The ball 26 is movably fitted in the through-hole 107 and normally projects slightly in the bore 104 due to an action of the leaf spring 24. In connection with such formation of the recess 106 and arrangement of the leaf spring 24 and ball 26, the block 200 of the pushing rod 20 is formed at a lower surface thereof with a concavity 200a of a semicircular shape, with which a part of the ball 26 projecting from the through-hole 107 in the bore 104 is adapted to be engaged. Such engagement of the ball 26 with the concavity 200a of the block 200 allows the rod 20 to be locked at the predetermined position within the bore 104 of the tubular body 100 against the action of the coiled spring 22. More particularly, when a user pulls the rod 20 in a direction drawing it out of the tubular body 100 through the grip 201 while causing the coiled spring 22 to be compressed, the block 200 is moved towards the second end 102 of the tubular body 100 to be abutted against the ball 26. Further pulling of the rod 20 permits the block 200 to be ridden on the ball 26 while depressing the ball 26 through the lower surface thereof against the action of the leaf spring 24 to cause the ball 26 to be retracted from the bore 104. Then, when the block 200 arrives at a position of engaging of the concavity 200a with the ball 26, the ball 26 having been depressed by the lower surface of the block 200 till now is operatively projected into the concavity 200a of the block 200 due to the action of the leaf spring 24 thus being engaged with the concavity 200a of the block 200. This engagement of the ball 26 with the concavity 200a allows the whole of the rod 20 including the block 200 to be locked with respect to the tubular body 100 against the action of the coiled spring 22. Such locking of the rod 20 with respect to the tubular body 100 may be easily released by pushing a tip end of the grip 201 towards the first end 101 of the tubular body 100. Then, as soon as the block 200 is released from the ball 26, the whole of the rod 20 including the block 200 is moved toward the first end 101 of the tubular body 100 due to the action of the coiled spring 22, while pushing an uppermost cartridge having been located in the bore 104 by means of the movable plate 18 in the same direction along the bore 104 of the tubular body 100.

A reference numeral 28 designates a pair of support plates having a substantially U-shape in vertical section. The support plates 28 are arranged on the lower wall surface near the first end 101 of the tubular body 100 so as to be extended along the axial direction of the tubular body 100 and spaced at the opened sides thereof from each other.

Incidentally, the coiled spring 22 provides the strength necessary to permit the pushing rod 20 to surely push a cartridge out of the first end 101 of the tubular body 100.

Figure 6:
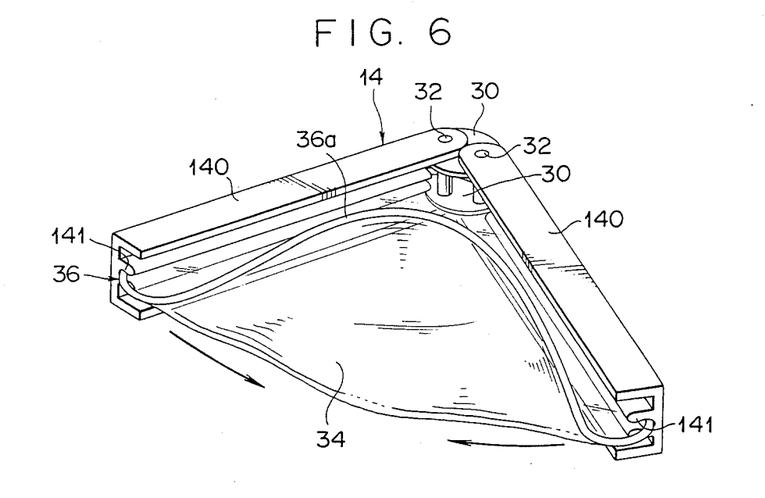
FIG. 6 is a schematic perspective view of a cartridge, in which a pair of casing members are opened.
Figure 7:
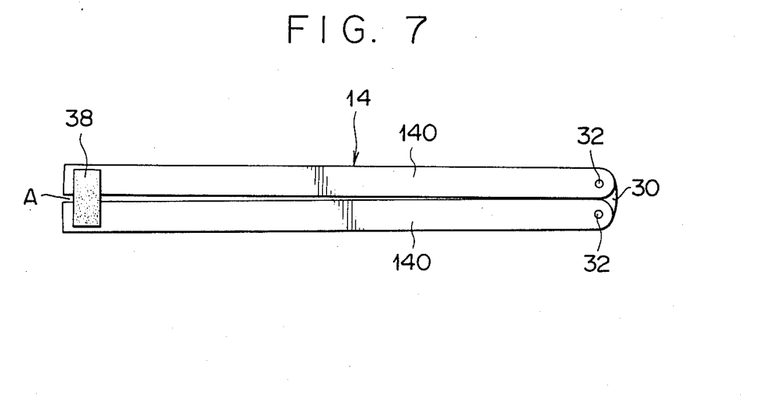
FIG. 7 is a plan view of the cartridge.
Figure 8:
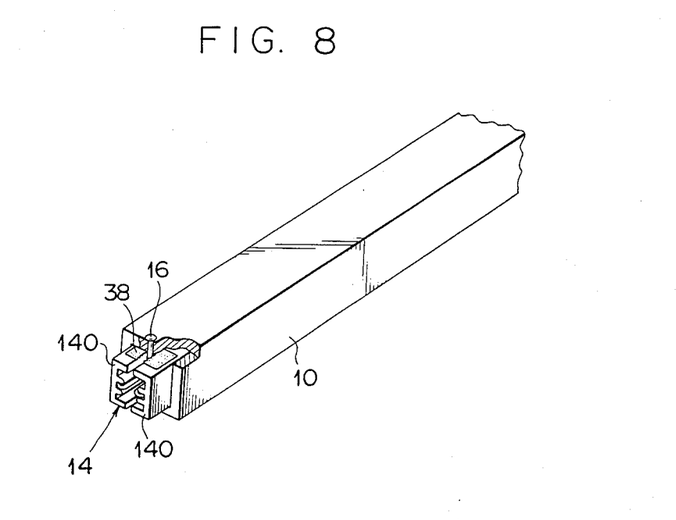
FIG. 8 is a schematic perspective view of assistance in explaining a state of a tape piece applied across onto upper surfaces of the casing members being torn by means of a pin.

The cartridge 14, as shown in FIG. 6, comprises a pair of casing members 140 each having a substantially U-like configuration in vertical section. Each casing member 140 is integrally formed along a longitudinal direction of an inner surface of an opened side thereof with a linear socket portion 141. The casing members 140 are pivotally connected at one end thereof to each other through a pair of substantially disk-like joining plates 30 by pins 32 so as to be faced to each other at the opened sides thereof. Also, arranged between the faced sides of the casing members 140 is a vinyl sack 34 having an opening 340 (FIG. 1) for receiving dung of a pet animal formed at a top portion thereof. More particularly, the vinyl sack 34 is provided along a margin of the opening 340 thereof with a resilient wire 36 such as a piano wire or the like, which resilient wire 36 is partially fitted in the socket portion 141 of each of the casing members 140 in a manner to creep along the socket portion 141. A part of the resilient wire 36, namely, a portion 36a of the resilient wire 36 being not fitted in the socket portions 141 of the casing members 140 and extending outwardly from the casing members 140 is folded back so as to be arranged in a space between the casing members 140 as shown in FIG. 6. The vinyl sack 34 supported between the casing members 140 by fitting the resilient wire 36 in the socket portions 141 of the casing members 140 as described above is folded up and then contained in the casing members 140 by closing the casing members 140 toward each other. In order to prevent the casing members 140 from being opened away from each other due to an elastic force of the resilient wire 36 during the movement of the cartridge 14, adhesive tape pieces 38 are applied onto upper and lower surfaces of free ends of the casing members 140 (only upper surfaces of the casing members 140 are shown in FIG. 7) in a manner to be laid across the casing members 140. Further, the adhesive tape pieces 38 are applied onto the casing members 140 so as to permit a space A to be left between the casing members 140, as shown in FIG. 7. The space A is enough to receive the pins 16 of the tubular body 100 therein, when the cartridge 14 is moved to the first end 101 of the tubular body 100 by the pushing rod 20. As described above, the application of the adhesive tape pieces 38 to the casing members 140 may prevent the casing members 140 from opening away from each other due to the elastic force of the resilient wire 36 during upward movement of the cartridge 14 through the movable plate 18 and longitudinal movement of the cartridge 14 through the pushing rod 20, so that the cartridge 14 may be smoothly moved.

Incidentally, each cartridge 14 is received within the housing body 120 of the storage means 12 in a manner such that the free end sides of the casing members 140 are faced toward the first end 101 of the tubular body 100.

Now, the manner of operation of the dung disposing implement of the illustrated embodiment constructed in the manner as described above will be described hereinafter with reference to the accompanying drawings.

First, when the cartridges 14 are moved upwardly within the housing body 120 of the storage means 12 by sliding upwardly the U-shaped portions 181 of the movable plate 18 along the slits 122 while deforming the bulged free ends 181a toward the other ends 181b of the U-shaped portions 181 by a user's fingers, an uppermost one of the cartridges 14 is moved in the longitudinal bore 104 of the tubular body 100. At this time, the bulged free ends 181a of the U-shaped portions 181 each are at the forming position of one of the recesses 123 on the slit 122 of the housing body 120. Accordingly, when the U-shaped portions 181 are released from the user's fingers, the bulged free ends 181a of the U-shaped portions 181 are operatively engaged with the recesses 123 due to the restoring force thereof. Thus, the movable plate 18 is stationarily positioned with respect to the housing body 120, so that the uppermost cartridge in the longitudinal bore 104 is prevented from being moved downwardly.

In a state that the uppermost cartridge is in the longitudinal bore 104 of the tubular body 100 and the pushing rod 20 is locked with respect to the tubular body 100 as shown in FIG. 5, when the grip 201 of the pushing rod 20 is pushed toward the first end 101 of the tubular body 100 by the user's hand, the pushing block 200 is released from the ball 26 to simultaneously move the uppermost cartridge along the bore 104 of the tubular body 100 towards the first end 101 of the tubular body 100 due to the action of the coiled spring 22. When the cartridge 14 reaches the first end 101 of the tubular body 100, the pointed tips of the pins 16 respectively extending through the upper and lower walls of the first end 101 of the tubular body 100 into the bore 104 are received in the space A between the casing members 140 of the cartridge 14. Then, the cartridge 14 is actively projected partially out of the first end 101 of the tubular body 100 by the pushing block 200 due to the continuous action of the coiled spring 22. In relation to such projecting motion of the cartridge 14, the pointed tips of the pins 16, having been in the space A between the casing members 140, are operatively squeezed between the casing members 140 to cause the adhesive tape pieces 38 attached across onto the upper and lower surfaces of the casing members 140 to be torn across. Then, when the tape pieces 38 are completely torn by the pointed pins 16, the casing members 140 are opened away from each other due to the elastic force of the resilient wire 36 of the vinyl sack 34 while being further actively projected out of the first end 101 of the tubular body 100 by the pushing block 200 due to the continuous action of the coiled spring 22. When the resilient wire 36 of the vinyl sack 34 having been folded between the casing members 140 causes the casing members 140 to be opened away from each other while restoring to an original state, the vinyl sack 34 having been folded up between the casing members 140 is simultaneously spread, resulting in the opening 340 of the vinyl sack 34 being completely opened. The projecting motion of the cartridge 14 out of the first end 101 of the tubular body 100, when the cartridge 14 is actively projected outwardly to abut against the pins 16 at the pivotal connecting portion of the casing members 140 thereof, is stopped with the cartridge 14 being supported at the connecting portion of the casing members 140 thereof with respect to the first end 101 of the tubular body 100 through the pins 16.

In a state of the opening 340 of the vinyl sack 34 being completely opened due to the elastic force of the resilient wire 36 as shown in FIG. 1, the user points the implement body to a pet animal so as to cause the opened vinyl sack 34 to be held to a rump of the pet animal, whereby the vinyl sack 34 can receive dung excreted from the pet animal therein.

After receiving dung of the pet animal in the vinyl sack 34, the cartridge 14 may be removed from the tubular body 100 by plucking out the pins 16 from the tubular body 100 with the user's fingers. Then, the so-removed cartridge is inserted between the support plates 28 arranged on the lower wall surface of the tubular body 100 while causing the casing members 140 to be closed toward each other with the user's fingers, thus being supported between the support plates 28. In this state of the implement supporting the dung received cartridge between the support plates 28 thereof, the user carries it to a place where a garbage box is set, and then removes the cartridge from the support plates 28 to dump it into the garbage box.

Thus, it will be noted that the implement for disposing of dung of a pet animal according to the present invention can easily and efficiently carry out disposing of dung of a pet animal with simple operation.

It will thus be seen that the objects set forth above, and those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. An implement for disposing of dung of a pet animal comprising:

tubular means consisting of an elongated tubular body which has first and second ends and a pair of pins removably fitted through upper and lower walls of said first end to project in a longitudinal bore of said tubular body;

storage means being mounted on said tubular body of said tubular means and for carrying vertically stacked cartridges therein;

a movable plate being movably supported with respect to said storage means and for moving said cartridges within said storage means one by one in said longitudinal bore of said tubular body;

a pushing rod being movably inserted at one end thereof from said second end of said tubular body in said longitudinal bore and for pushing a cartridge having been located in said longitudinal bore of said tubular body by said movable plate towards said first end along said longitudinal bore of said tubular body; and each of said cartridges includes a pair a casing members each having a substantially U-shape in vertical section and being pivotally connected at one end thereof to each other in a manner to be faced at an opened side thereof to each other; a vinyl sack having an opening for receiving dung of a pet animal therein and having a resilient wire provided along a margin of said opening of said vinyl sack, said vinyl sack being supported through said resilient wire between the faced sides of said casing members in a manner to be folded up; and two tape pieces applied across onto upper and lower surfaces of said casing members to cause said casing members to be closed toward each other against an elastic force of said resilient wire in a manner to permit a space to be left between said casing members, said space being enough to receive tip ends of said pins of said tubular body therein when said cartridge is moved to said first end of said tubular body by means of said pushing rod.

2. An implement for disposing of dung of a pet animal as defined in claim 1 and which includes support means arranged on a lower wall surface near said first end of said tubular body and for supporting a dung received cartridge therethrough.

3. An implement for disposing of dung of a pet animal as defined in claim 1, wherein said storage means is removably mounted on said tubular body of said tubular means.

4. An implement for disposing of dung of a pet animal as defined in claim 1, wherein said storage means consists of a substantially box-like housing body being adapted to carry vertically stacked cartridges therein, said housing body comprising a vertically linear slit formed at each side wall of said housing body and a plurality of recesses formed along said linear slit at equal intervals; and said movable plate comprises a plate body and substantially U-shaped portions made of flexible material and extending outwardly from both sides of said plate body, said U-shaped portions each being bulged at a free end thereof, which movable plate is movably supported with respect to said storage means in a manner such that said plate body thereof is arranged in said housing body, said U-shaped portions thereof are projected outwardly through said linear slits of said housing body and said bulged free ends thereof are fitted in said linear slits, respectively, so that said movable plate can be moved in said housing body while being guided along said linear slits through said U-shaped portions and when said U-shaped portions each arrive at one of said recesses of said linear slit, said bulged free ends of said U-shaped portions are adapted to be engaged with said recesses due to a restoring force thereof.

5. An implement for disposing of dung of a pet animal as defined in claim 1, wherein said pushing rod comprises a block provided at said one end of said pushing rod in said longitudinal bore of said tubular body, said block being smaller than a diameter of said longitudinal bore; and a grip integrally formed at the other end of said pushing rod projecting outwardly from said second end of said tubular body.

6. An implement for disposing of dung of a pet animal as defined in claim 5, wherein said tubular body further comprises a linear guide slit formed at an upper wall of said tubular body along an axial direction of said tubular body;

said block of said pushing rod includes a projection provided on an upper surface of said block, said projection extending outwardly through said linear guide slit of said tubular body to be guided through said linear guide slit in relation to longitudinal movement of said pushing rod; and a horizontal plate integrally connected perpendicularly to a tip end of said projection, said horizontal plate being formed with more than a width of said linear guide slit.

7. An implement for disposing of dung of a pet animal as defined in claim 6, wherein said second end of said tubular body is closed and the other end of said pushing rod is projected outwardly through said closed second end of said tubular body.

8. An implement for disposing of dung of a pet animal as defined in claim 7 and which includes spring means mounted on an outer periphery of said rod and arranged between said block and said closed second end of said tubular body in said longitudinal bore of said tubular body to always urge said pushing rod toward said first end of said tubular body.

9. An implement for disposing of dung of a pet animal as defined in claim 8 and which includes an engaging ball and concavity combination locking said pushing rod with respect to said tubular body to prevent longitudinal movement of said rod in said longitudinal bore of said tubular body against an action of said spring means.

10. An implement for disposing of dung of a pet animal as defined in claim 9, wherein said tubular body includes a recess formed in a lower wall portion near said closed second end of said tubular body, a through-hole formed to allow said recess to communicate with said longitudinal bore therethrough, and a leaf spring seated at one end thereof against an upper surface of said recess; and said engaging ball and concavity combination includes a ball rollably supported on an upper surface of the other end of said leaf spring and being slightly projected through said through-hole in said longitudinal bore of said tubular body due to an action of said leaf spring, and a concavity formed on a lower surface of said block, so that said rod is prevented from moving in said longitudinal bore of said tubular body against the action of said spring means when said ball is engaged with said concavity of said block.

11. An implement for disposing of dung of a pet animal as defined in claim 1, wherein said casing members of said cartridge are pivotally connected at said one end thereof to each other through a pair of substantially disk-like joining plates by pins.

12. An implement for disposing of dung of a pet animal as defined in claim 1, wherein each of said casing members has a linear socket portion integrally formed along a longitudinal direction of an inner surface of said opened side of said casing member and said vinyl sack is supported between said casing members in a manner such that said resilient wire of said viny sack is fitted in said linear socket portion of each of said casing members.

13. An implement for disposing of dung of a pet animal as defined in claim 12, wherein said casing members of said cartridge are pivotally connected at said one end thereof to each other through a pair of substantially disk-like joining plates by pins.

14. An implement for disposing of dung of a pet animal as defined in claim 1, wherein said resilient wire is a piano wire.

15. An implement for disposing of dung of a pet animal comprising:
tubular means consisting of an elongated tubular body, said tubular body comprising a first end, a second end being closed , a pair of pins removably fitted through upper and lower walls of said first end to project in a longitudinal bore of said tubular body, a recess formed in a lower wall portion near said closed second end of said tubular body, a through-hole formed to allow said recess to communicate with said longitudinal bore therethrough, a leaf spring seated at one end thereof against an upper surface of said recess, and a linear guide slit formed at an upper wall of said tubular body along an axial direction of said tubular body;
storage means consisting of a substantially box-like housing body which is removably mounted on said tubular body and for carrying vertically stacked cartridges therein, said housing body comprising a vertically linear slit formed at end side wall of said housing body and a plurality of recesses formed along said vertically linear slits at equal intervals;
a movable plate for moving said cartridges within said housing body one by one in said longitudinal bore of said tubular body and comprising a plate body and substantially U-shaped portions made of flexible material and extending outwardly from both sides of said plate body, said U-shaped portions each being bulged at a free end thereof, which movable plate is movably supported with respect to said storage means in a manner such that said plate body thereof is arranged in said housing body, said U-shaped portions thereof are projected outwardly through said linear slits of said housing body and said bulged free ends thereof are fitted in said linear slits, respectively, so that said movable plate can be moved in said housing body while being guided along said linear slits through said U-shaped portions and when said U-shaped portions each arrive at one of said recesses of said linear slit, said bulged free ends of said U-shaped portions are adapted to be engaged with said recesses of said housing body due to a restoring force thereof;
a pushing rod being movably inserted at one end thereof in said longitudinal bore of said tubular body and projected outwardly at the other end thereof through said closed second end of said tubular body and for pushing a cartridge having been located in said longitudinal bore of said tubular body by said movable plate towards said first end along said longitudinal bore of said tubular body; said pushing rod comprising a block provided at said one end of said pushing rod and a grip intergrally formed at the other end of said pushing rod; said block being smaller than a diameter of said longitudinal bore and comprising a projection provided on an upper surface of said block, said projection extending outwardly through said linear guide slit of said tubular body to be guided through said linear guide slit in relation to longitudinal movement of said pushing rod, and a horizontal plate integrally connected perpendicularly to a tip end of said projection, said horizontal plate being formed with more than a width of said linear guide slit of said tubular body;
spring means mounted on an outer periphery of said rod and arranged between said block and said closed second end of said tubular body in said longitudinal bore of said tubular body to always urge said pushing rod toward said first end of said tubular body;
an engaging ball and concavity combination locking said pushing rod with respect to said tubular body to prevent longitudinal movement of said rod in said longitudinal bore of said tubular body against an action of said spring means; said engaging ball and concavity combination comprising a ball rollably supported on an upper surface of the other end of said leaf spring and being slightly projected through said through-hole in said longitudinal bore of said tubular body due to an action of said leaf spring, and a concavity formed on a lower surface of said block, so that said rod is prevented from moving in said longitudinal bore of said tubular body against the action of said spring means when said ball is engaged with said concavity of said block; and each of said cartridges comprises a pair of casing members each having a substantially U-shape in vertical section and having a linear socket portion integrally formed along a longitudinal direction of an inner surface of an opened side of said casing member, said casing members being pivotally connected at one end thereof to each other through a pair of substantially disk-like joining plates by pins in a manner to be faced at said opened side thereof to each other; a vinyl sack having an opening for receiving dung of a pet animal therein and having a resilient wire provided along a margin of said opening of said vinyl sack, said vinyl sack being supported between the faced sides of said casing members in a manner such that said resilient wire of said vinyl sack is fitted in said socket portion of each of said casing members, and in a manner to be folded up between said casing members; and two tape pieces applied across onto upper and lower surfaces of said casing members to cause said casing members to be closed toward each other against an elastic force of said resilient wire in a manner to permit a space to be left between said casing members, said space being enough to receive tip ends of said pins of said tubular body therein when said cartridge is moved to said first end of said tubular body by means of said rod.

* * * * *